United States Patent [19]

Tsujimoto et al.

[11] Patent Number: 5,319,402
[45] Date of Patent: Jun. 7, 1994

[54] DATA IMPRINTING DEVICE FOR CAMERA

[75] Inventors: Shinichi Tsujimoto, Tokyo; Jiro Kazumi, Kanagawa, both of Japan

[73] Assignee: Canon Kabushiki Kaisha, Tokyo, Japan

[21] Appl. No.: 262,221

[22] Filed: Oct. 21, 1988

Related U.S. Application Data

[63] Continuation of Ser. No. 921,958, Oct. 20, 1986, abandoned.

[30] Foreign Application Priority Data

Oct. 24, 1985 [JP] Japan .................................. 60-236458

[51] Int. Cl.⁵ .......................................... G03B 17/24
[52] U.S. Cl. ...................................... 354/106; 355/40
[58] Field of Search .............................. 354/105–109, 354/21; 355/39, 40, 41

[56] References Cited

U.S. PATENT DOCUMENTS 3,889,281 6/1975 Taguchi et al. ..................... 354/105
3,995,289 11/1976 Shono .................................. 354/109
4,420,236 12/1983 Taniguchi et al. .................... 354/21

Primary Examiner—David M. Gray
Attorney, Agent, or Firm—Fitzpatrick, Cella, Harper & Scinto

[57] ABSTRACT

A data imprinting device for a camera wherein the exposure of imprinting data is changed by the information from the film sensitivity setting means. The device is provided with imprinting exposure control means operating in such a manner that when the picture exposure correction factor setting means is operated in a direction to increase the exposure, the data exposure determined based on the film sensitivity setting means is caused to increase.

20 Claims, 3 Drawing Sheets

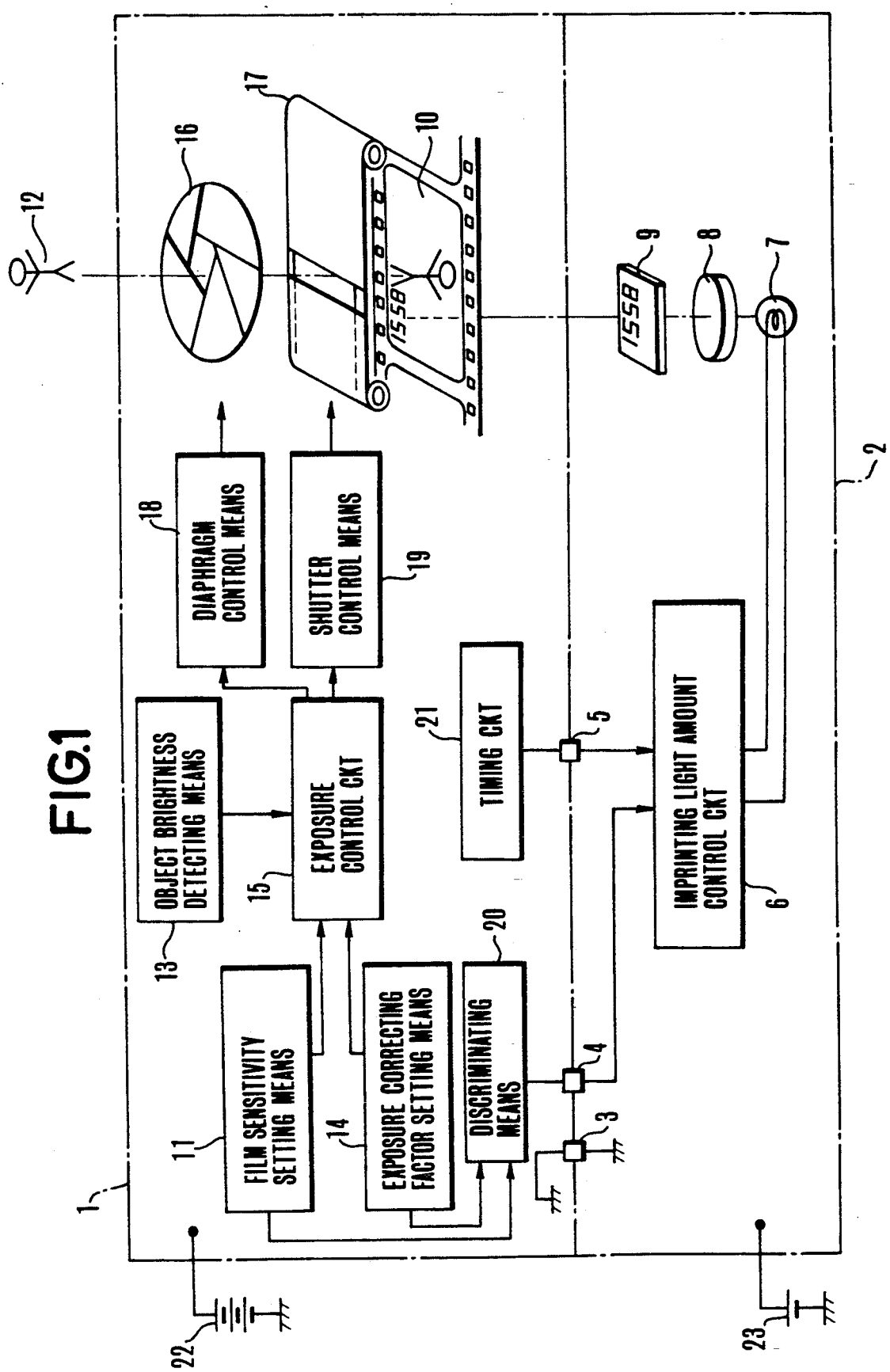

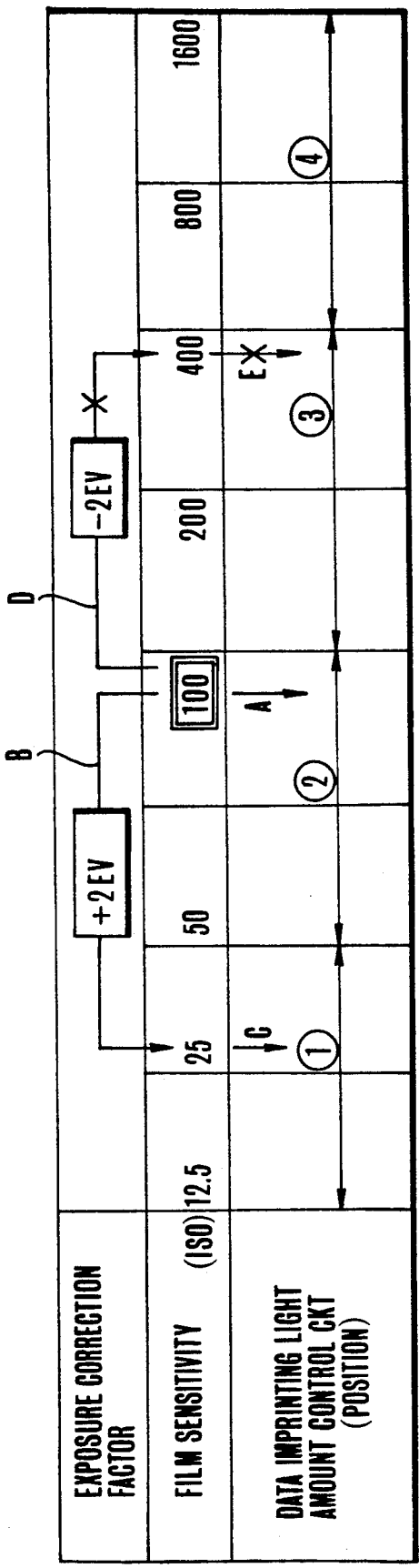

DATA IMPRINTING DEVICE FOR CAMERA

This application is a continuation of application Ser. No. 921,958 filed Oct. 20, 1986, now abandoned.

BACKGROUND OF THE INVENTION

1. Field of the Invention

This invention relates to improvements of the device for imprinting letters, numerals or other data on film frames in the camera when the exposure is made.

2. Description of the Related Art

A variety of devices for imprinting data such as the date on the film when the exposure is made have been proposed and some of them have been put into practice.

For example, U.S. Pat. No. 3,889,281 shows a proposal that the intensity of light or the lighting time of a miniature lamp or light emitting diode as the light source for imprinting data is made manually variable in view of the sensitivity of the used photographic film in order to insure that, as the data exposure is suitably corrected to the given film speed, the imprinted data are clear enough as shown in FIG. 3(a). Thus, the imprinted data are prevented from becoming unreadable due to the under-exposure as shown in FIG. 3(b), or from diffusing to a large loss in the sharpness due to the over-exposure as shown in FIG. 3(c). With this device, however, each time the type of film, and particularly the film speed, change, the photographer needs to reset the value of film speed in the data imprinting device built in the back cover of the camera by manually operating the film speed selector knob. Such a requirement is very inconvenient.

To eliminate this drawback, there has been a previous proposal that once the film sensitivity is set in the camera, or when a film cartridge having information codes for the sensitivity is loaded in the camera, the exposure factor for the data imprinting device is automatically taken at a suitable value to the sensitivity of the used film, as, for example, disclosed in U.S Pat. No. 4,420,236.

However, in the above-described examples of the prior art, the exposure correction factor setting means of the camera is operated in accordance with the desired picture quality of the photographer when shooting. In the exposure value computing circuit of the camera, the preset film sensitivity information and the desired value of the exposure correction factor can both be taken into account in deriving an exposure value, i.e. aperture value (Av) or shutter time (Tv) from the brightness of the object to be photographed so that a desired result or a picture can be attained. But, in the data imprinting device, only the film sensitivity information is given and the data exposure is not corrected in accompaniment with the change of the exposure correction factor.

Therefore, if the exposure correction of the camera is operated in a direction to increase the exposure, the photographic light amount (the exposure of the camera) increases despite the preset film sensitivity remaining constant. But, in the data imprinting device, because the exposure of letters or the like is made based on the preset film sensitivity, ignoring the aforesaid exposure correction, the data imprinting light amount becomes insufficient relative to the photographic light amount. This has constituted a problem of failing to imprint clear images of the data.

SUMMARY OF THE INVENTION

An object of the present invention is to eliminate the above-described problem and to provide a data imprinting device in which when a value of the exposure correction factor is introduced into the camera, the data exposure is simultaneously corrected, thus assuring a capability of imprinting clear data.

To achieve the above-stated object, the present invention is to provide for the device with imprinting light amount control means operating in such a manner that when the exposure correction factor setting means is operated in a direction to increase the exposure, the data imprinting exposure amount determined based on the film sensitivity setting means is increased so that the data imprinting light amount is made to correspond to both of the film sensitivity and the increase in the exposure correction factor.

BRIEF DESCRIPTION OF THE DRAWINGS

FIG. 1 is a block diagram of the circuitry of an embodiment of the invention.

FIG. 2 is a diagram illustrating the relationships of the values of the exposure correction factor, the values of the film sensitivity (ISO), and the positions of the data imprinting light amount control circuit.

FIGS. 3(a) to 3(c) are representations of the imprinted data with different degrees of sharpness resulting from the over, proper and under exposures of the data.

DETAILED DESCRIPTION OF THE PREFERRED EMBODIMENTS

Figure 4:
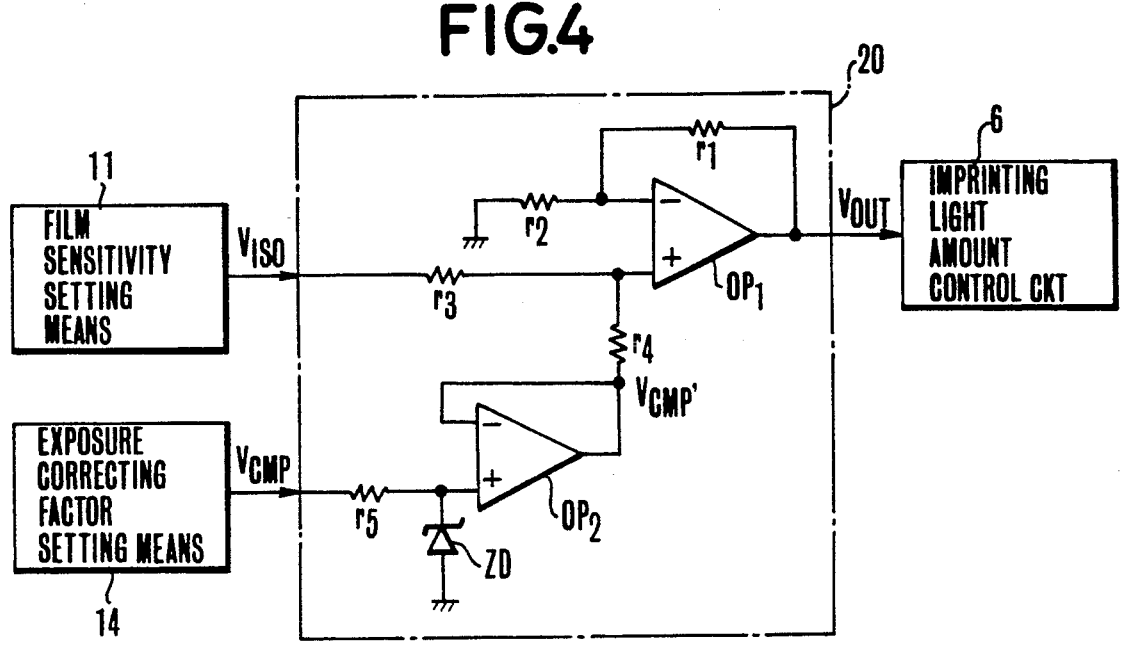
FIG. 4 is an electrical circuit diagram illustrating the details of the discriminating means of FIG. 1.

In FIG. 1, there is shown the arrangement of the circuit portions of one embodiment of the invention.

A camera 1 and a data imprinting device 2 are electrically connected to each other by terminals 3, 4 and 5.

In the data imprinting device 2, there is provided an imprinting light amount control circuit 6 having two inputs connected to the terminals 4 and 5 respectively, a light source 7 whose brilliance or lighting time is controlled by the circuit 6, an imprinting optical system 8 and a data display 9.

The light source 7, lens 8 and display 9 are arranged to imprint data on a film 10 in the camera 1.

In the camera 1 there are provided film sensitivity setting means 11 for setting the film sensitivity either directly by the photographer with the help of a film sensitivity table, or automatically in response to an input signal from a film cartridge having information codes (DX film), object brightness detecting means 13 for detecting the brightness of an object 12 to be photographed by light measuring information from a light measuring circuit (not shown), and exposure correction factor setting means 14 which is manipulated only when the photographer has a particular aim to modify the normal exposure. For note, for a camera of another type in which the light measuring information is evaluated to automatically determine a value of the exposure correction factor, the aforesaid exposure correction factor setting means 14 should be replaced by an automatically operated one.

The above-described film sensitivity setting means 11, the object brightness detecting means 13 and the exposure correction factor setting means 14 are connected to an exposure control circuit 15 so that information of the film sensitivity, object brightness and exposure correction can be entered into it. And, the exposure control circuit 15 is controllably connected to diaphragm control means 18 and shutter control means 19 for controlling the size of aperture opening of a diaphragm 16 and the speed of a shutter 17, respectively.

Also, the film sensitivity setting means 11 and the exposure correction factor setting means 14 are connected through common discriminating means 20 for treating the film sensitivity information and the exposure correction information to the imprinting light amount control circuit 6 of the data imprinting device 2.

A timing circuit 21 responsive to depression of a release button of the camera 1 produces an actuating signal for the imprinting light amount control circuit 6 to indicate the start of lighting on the light source 7. Electrical power sources 22 and 23 are connected respectively to the camera 1 and the data imprinting device 2.

FIG. 2 illustrates an example of selection of each position of the imprinting light amount control circuit 6 depending on the preset values of the exposure correction factor and the film sensitivity (ISO).

In the example of actual practice shown in FIG. 2, the time of energization or the brilliance of the light source 7 is previously determined to vary in four discrete values ① to ④. For a film whose sensitivity is up to 25 in ISO, a position ① is taken, for up to 100, another position ②, for up to 400, another position ③, and for up to 1600, another position ④ is taken. The light amounts of the light source 7 in these positions (1) to (4) are related as follows:

①>②>③>④

Next, we explain the operation by reference to FIGS. 1 and 2.

In the case when the exposure correction factor setting means 14 is not operated, the exposure control circuit 15 receptive of the film sensitivity information from the film sensitivity setting means 11 and the object brightness information from the object brightness detecting means 13 computes an exposure value. The size of aperture opening of the diaphragm and the shutter time are controlled in accordance with the computed exposure value by the diaphragm control means 18 and the shutter control means 19, respectively. Then, an exposure is made.

When making the exposure, the discriminating means 20, because of its receiving no exposure correction information from the exposure correction factor setting means 14 places only the film sensitivity information onto the output line to the imprinting light amount control circuit 6. For example, when the film sensitivity (ISO) is 100, the position ② of the imprinting light amount control circuit 6 is selected as indicated by an arrow A in FIG. 2. Based on the above-described selection of one of the positions of the imprinting light amount control circuit 6, the time of energization of, or the intensity of light radiating from, the light source 7 is controlled, and the corresponding value of the imprinting light amount is set. By this preset light amount, the data of the display 9 is imprinted on the film 10 through the imprinting optical system 8.

Now assuming that as the photographer has an intention of changing the normal exposure, when the exposure correction factor setting means 14 is operated in a direction to increase the exposure, the film sensitivity setting means 11 produces an output of the film sensitivity information representing, for example, 100 in ISO, and at the same time the exposure correction factor setting means 14 produces an output of the exposure correction information representing, for example, +2EV, then the discriminating means 20 produces an output representing the aforesaid film sensitivity information plus the exposure correction information which output is applied to the imprinting light amount control circuit 6. As shown by arrows B and C in FIG. 2, the imprinting light amount control circuit 6 also is selectively set in the position ① depending on the operative position of the exposure correction factor setting means 14.

Therefore, the data imprinting light amount of the light source 7 is increased to a corresponding value to the value of 25 in film sensitivity (ISO) in proportion to the increase of the photographic light amount. Thus, the data imprinting light amount is prevented from becoming insufficient, and the imprinting of clear data can be carried out.

For note, if the exposure correction information of, for example, +1EV is produced from the exposure correction factor setting means 14, a +1EV-added film sensitivity information is produced from the discriminating means 20. But, because the film sensitivity (ISO) corresponding to this case is 50, the imprinting light amount control circuit 6 takes the position ②. Hence, the equivalent position to that in the case of not operating the exposure correction factor setting means 14 is set. If the value of the correction factor in the exposure correction factor setting means 14 is so small that no appreciably insufficient data imprinting light amount will result as has been described above, the data imprinting operation is performed without having to change the time of energization or the brilliance of the light source 7.

Alternatively, assuming that the exposure correction factor setting means 14 is operated in the opposite direction to decrease the exposure by the photographer, so that, for example, the film sensitivity information of 100 in ISO is produced from the film sensitivity setting means 11, and at the same time an exposure correction information of −2EV is produced from the exposure correction factor setting means 14, then the discriminating means 20 ignores that value of the exposure correction factor. Therefore, the selection of the corrected position ③ indicated by arrows D and E in FIG. 2 does not take place. Instead, according to the arrow A, the set position ② of the imprinting light amount control circuit 6 is preserved.

Also, not being confined to the example of ISO 100 described above, the discriminating means 20 alters its output content to the imprinting light amount control circuit 6 when the exposure correction factor setting means 14 is operated to the (+) side with the increase of the exposure. It is, however, only when the exposure correction factor setting means 14 is operated to the (−) side with the decrease of the exposure that it does not alter its output content, but sets the imprinting light amount control circuit 6 to that position which is determined only by the output of the film sensitivity setting means 11.

It is to be noted that the use of such a feature that the output content of the discriminating means 20 has, despite the exposure correction factor setting means is operated so as to decrease the exposure, to be left unaltered will lead to a consideration that since the situation becomes the same as the apparent data imprinting light amount is increased relative to the exposure for the picture, the clear data could no longer be imprinted due to the diffusion shown in FIG. 3(c). But, in the usual data imprinting device 2, the determination of the imprinting light amount is made in such way that, for a black object or like object that gives no light on the film, no diffusing arises under the condition of making no exposure correction. Therefore, it would have been rather worse to otherwise make the data imprinting light amount to decrease in response to operation of the exposure correction to the range of minus values, because it results in the decrease of the light amount beyond the linear range (latitude) of film sensitivities. This implies that the clear imprinting of data rather fails due to the insufficient light amount for imprinting the data.

An example of the construction of the elements of the discriminating means 20 is shown in FIG. 4. The blocks 11, 14, 20 and 6 are those shown in FIG. 1, namely, the film sensitivity setting means, the exposure correction factor setting means, the discriminating means and the imprinting light amount control circuit respectively. OP1 and OP2 are operational amplifiers; ZD is a Zener diode; r1 to r5 are resistors.

Figure 5:
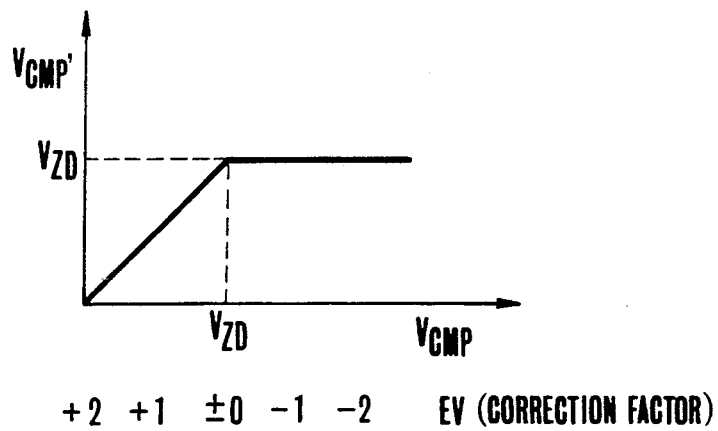
FIG. 5 is a graph taken to explain the inputoutput relationship in the circuit of FIG. 4.

The film sensitivity information $V_{ISO}$ from the film sensitivity setting means 11 and the exposure correction information $V_{CMP}$ from the exposure correction factor setting means 14 are produced as the respective voltages. By the Zener diode ZD, the output $V_{CMP}$ of the exposure correction factor setting means 14 and the output $V_{CMP}'$ of the operational amplifier OP2 are caused to have such a relationship as shown in FIG. 5. Thereby, the output $V_{OUT}$ of the discriminating means 20, when the exposure correction factor setting means is operated to the (+) side with an increase of the exposure, becomes $$V_{OUT} = V_{ISO} + V_{CMP}$$

that is, the film sensitivity information is altered by the exposure correction information. When the exposure correction factor setting means 14 is operated to the (−) side, however, it becomes $$V_{OUT} = V_{ISO} + V_{ZD} \text{ (constant)}$$

where $V_{ZD}$ is the Zener voltage of the Zener diode. Thus, the exposure correction information does not affect the film sensitivity information.

Though, in the above-described embodiment, the discriminating means 20 is provided in the camera 1, it may be arranged in the data imprinting device 2. Also, it may be incorporated into the imprinting light amount control circuit 6.

Also, though the imprinting light amount control circuit 6 is made to operate with selection of four prescribed values of the time of energization or the brilliance of the light source 7, it is to be understood that the number of different values may be increased provided that they are all selectively settable in correspondence with the variation of the film sensitivity, or may be conversely decreased to 2 or 3.

Further, as the light source 7 and the data display 9 use may be made of a single member in the form of, for example, a self-light-emitting display comprising light emitting diodes. Also, the imprinting optical system 8, the data display 9, the film 10, the diaphragm 16 and the shutter 17 are not confined to the illustrated ones.

As has been described above, according to the present invention, the data imprinting device is provided with an imprinting light amount control means responsive to direction of the operation of the exposure correction factor setting means of the camera toward an increase of the exposure for controlling the data imprinting light amount in a direction to increase, thereby the data imprinting light amount is made to correspond to both of the film sensitivity and the increase of the exposure correction factor from zero with an advantage that clear data can be imprinted as the exposure of the data is also corrected when the exposure of the camera is corrected.

What is claimed is:

1. A camera having a data imprinting device, comprising:
    (A) exposure control means for controlling an amount of light from an object to be photographed that is incident on sensitive means;
    (B) varying means for varying the amount of object light that said exposure control means controls to be incident on the sensitive means; and
    (C) light amount setting means for setting a data imprinting light amount, said light amount setting means setting said data imprinting light amount in accordance with a sensitivity of the sensitive means and information from said varying means regarding the amount of object light controlled to be incident on the sensitive means.

2. A camera according to claim 1, wherein said light amount setting means includes discriminating means for causing said data imprinting light amount to increase in response to an increase in the incident amount of object light by said varying means.

3. A camera according to claim 2, wherein said discriminating means is arranged not to decrease said imprinting light amount in response to a decease in the incident amount of object light by said varying means.

4. A camera according to claim 1, wherein said light amount setting means includes discriminating means for causing said data imprinting light amount not to alter when said varying means has operated so as to decrease the incident amount of object light.

5. A camera according to claim 1, wherein said light amount setting means is arranged to prevent said data imprinting light amount from changing when the sensitivity information of said sensitive means and a varying value of said varying means are within a predetermined value.

6. A camera according to claim 1, wherein said exposure control means comprises determining means for determining a proper incident amount of light from the object in accordance with at least one of brightness of the object and a sensitivity of the sensitive means, and said varying means comprises means for varying the incident light amount determined by the determining means.

7. A camera according to claim 1, wherein said varying means comprises setting means, operable by a camera operator, for setting exposure variance information and means for varying the amount of light that said exposure control means controls to be incident on the sensitive means in accordance with the exposure variance information set by the setting means.

8. A data imprinting device which receives from an image recording device information regarding both a sensitivity of an image recording medium and an exposure light amount that is varied by an exposure control device, and which imprints data on the image recording medium, comprising:

(A) imprinting means for imprinting the data on the image recording medium; and (B) light amount setting means for setting an imprinting light amount of the imprinting means, said light amount setting means setting said imprinting light amount in accordance with the sensitivity and exposure light amount information received from the image recording device.

9. A camera according to claim 8, wherein said light amount setting means includes discriminating means for causing the imprinting light amount to increase in response to an increase in the exposure light amount by said exposure control means.

10. A camera according to claim 9, wherein said discriminating means is arranged not to decrease the imprinting light amount in response to a decrease in the exposure light amount by said exposure control means.

11. A camera according to claim 8, wherein said light amount setting means includes discriminating means for causing the imprinting light amount not to alter when said exposure control means has operated so as to decrease the exposure light amount.

12. A camera according to claim 8, wherein said light amount setting means is arranged to prevent the imprinting light amount from changing when the sensitivity of the image recording medium and an exposure value for varying the exposure light amount controlled by said exposure control means are within a predetermined range.

13. A data imprinting device for imprinting data on an image recording medium and for receiving from an image recording device information regarding an exposure amount for recording an image on the image recording medium, comprising:

(A) imprinting means for imprinting the data on the image recording medium by emission of light; and (B) light emission amount setting means for setting a light emission amount for the data imprinting by said imprinting means in accordance with the exposure amount information.

14. A data imprinting device according to claim 13, wherein the image recording device includes exposure control means for controlling the exposure amount according to sensitivity of the image recording medium and varying means for varying the amount of exposure light that the exposure control means controls to be incident on the image recording medium, and wherein said light emission amount setting means determines the light emission amount in accordance with the exposure amount varied by the varying means.

15. A data imprinting device according to claim 13, wherein said light emission amount setting means includes means for increasing the light emission amount for the data imprinting as the exposure amount increases.

16. A camera having a data imprinting device for imprinting data on an image recording medium, comprising:

(A) imprinting means for imprinting the data on the image recording medium by emission of light; and (B) light emission amount setting means for setting a light emission amount for the data imprinting by said imprinting means in accordance with an exposure light amount for recording an image on the image recording means.

17. A camera according to claim 16, further comprising:

exposure control means for controlling the exposure light amount in accordance with sensitivity of the image recording medium; and varying means for varying the exposure light amount that said exposure control means controls to be incident on the image recording medium, wherein said light emission amount setting means determines the light emission amount in accordance with the exposure light amount varied by the varying means.

18. A camera according to claim 16, wherein said light emission amount setting means includes means for increasing the light emission amount for the data imprinting as the exposure light amount increases.

19. A camera having a data imprinting device, comprising:

exposure control means for controlling an amount of light from an object to be photographed that is incident on an image recording medium;

varying means for outputting control information used by said exposure control means to vary the amount of light incident on the image recording medium, and determination means for determining an imprinting light level for the imprinting device and for outputting a signal indicative of the determined imprinting light level, said determination means comprising means for receiving the control information output by said varying means and means for determining the imprinting light level in accordance with the received control information and sensitivity information for the image recording medium.

20. A camera according to claim 19, wherein said determination means further comprises means for determining the imprinting light level based on both the control information and the sensitivity information, when the control information indicates an increase in the incident light amount, and based on the sensitivity information without the control information, when the control information indicates a decrease in the incident light amount.

* * * * *

UNITED STATES PATENT AND TRADEMARK OFFICE
CERTIFICATE OF CORRECTION

PATENT NO. : 5,319,402
DATED : June 7, 1994
INVENTOR(S) : SHINICHI TSUJIMOTO, ET AL.

It is certified that error appears in the above-indentified patent and that said Letters Patent is hereby corrected as shown below:

COLUMN 2,

Line 33, "inputoutput" should read --input-output--.

COLUMN 6,

Line 39, "decease" should read --decrease--.

COLUMN 7,

Line 13, "camera" should read --device--;
    Line 18, "camera" should read --device--;
    Line 22, "camera" should read --device--; and
    Line 27, "camera" should read --device--.

UNITED STATES PATENT AND TRADEMARK OFFICE
CERTIFICATE OF CORRECTION

PATENT NO. : 5,319,402
DATED : June 7, 1994
INVENTOR(S) : SHINICHI TSUJIMOTO, ET AL.

It is certified that error appears in the above-indentified patent and that said Letters Patent is hereby corrected as shown below:

COLUMN 8,

```
Line 13, "means." should read --medium--;
Line 24, "by the" should read --by said--; and
Line 38, "medium," should read --medium;--.
```

Signed and Sealed this

Twenty-fifth Day of October, 1994

Attest:

Attesting Officer

BRUCE LEHMAN

Commissioner of Patents and Trademarks